Feb. 21, 1967  J. H. CALDERONI ETAL  3,305,207
MICROMETERING VALVE

Filed March 30, 1964  2 Sheets-Sheet 1

INVENTORS
JOHN H. CALDERONI
ANTHONY J. IOZZI
BY
Owen, Wickersham & Erickson
ATTORNEYS

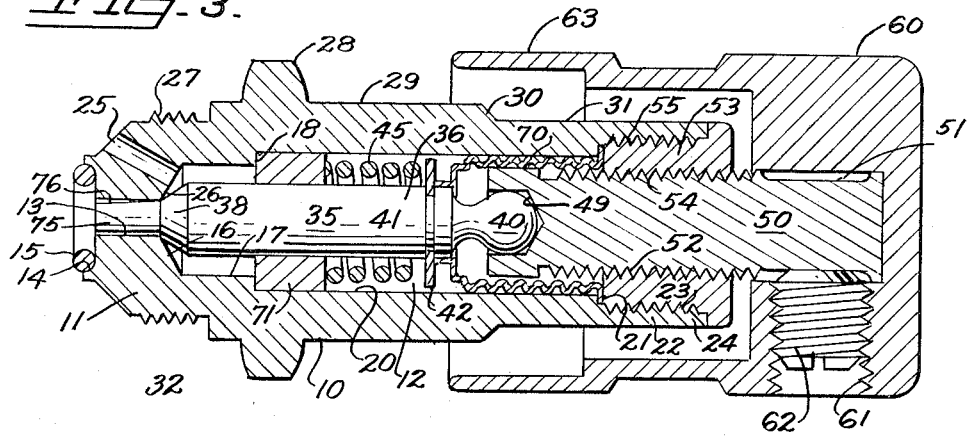
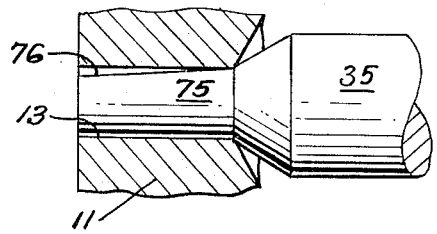
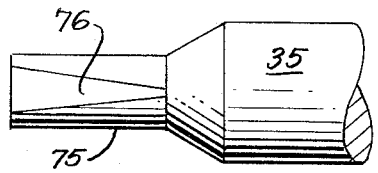
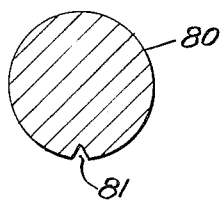
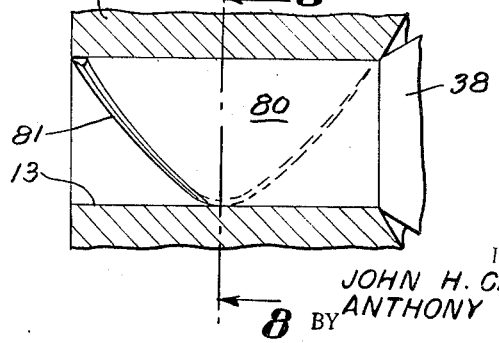

United States Patent Office 3,305,207
Patented Feb. 21, 1967

3,305,207
MICROMETERING VALVE
John H. Calderoni, El Cerrito, and Anthony J. Iozzi, Moraga, Calif., assignors to National Welding Equipment Co., Richmond, Calif., a corporation of California
Filed Mar. 30, 1964, Ser. No. 355,860
7 Claims. (Cl. 251—86)

This invention relates to a fine-metering or micrometering valve for gases, particularly for high-pressure gases.

The handling of high-pressure gases, many of which are combustible, imposes stringent requirements for valves, and when it is desired to meter them accurately and to provide delicate adjustments of flow and for certainty of closure, difficulties are encountered. Heretofore, most such valves have been subject to extreme wear and galling of the valve stem and body; this wear has apparently been produced largely by the rubbing of the metal at the valve seating surfaces. Such rubbing has also caused surface heating with subsequent coalescence of the metals and some transfer of metal from one surface to the other, to the detriment of the valve and to its accurate operation.

The present invention deals with these problems by providing a valve in which the stem does not rotate but merely moves in translation toward and away from its seat in a way that is very accurately controlled. In this invention, the air space between the inlet and the outlet is kept small while at the same time the valve stem is kept sealed with respect to the housing during its movement in the housing.

Although non-rotating valve stems have been known, they have not been comparable to the non-rotating stem of the present invention nor able to obtain the results it achieves by means of its novel structure, and there are other structural novelties which will be described.

Another problem has been to achieve precise control of very small gas flow rates—in the order of five or ten cubic centimeters per minute—and to control such flow within a small percent of variation. The novel structure of the nose of the valve stem of this invention enables it to get very accurate control of these very slow flow rates.

Repeatability is another problem: to enable the same valve handle position to mean one and only one rate of flow in a given pressure-regulated system. Backlash of threads and other factors have led to lost motion that has interfered with the accuracy of repeatability. The present invention enables elimination of backlash and assurance of repeatability.

Other objects and advantages of the invention will be apparent from the following description of a preferred embodiment.

In the drawings:

FIG. 3 is a view like FIG. 1 of a modified form of the invention, with the valve shown in an open position.

FIG. 4 is a fragmentary enlarged view in elevation and in section of a modified form of flow-control forward stem or nose.

FIG. 5 is a view in section taken along the line 5—5 in FIG. 4.

FIG. 6 is a top plan view of the stem or nose of FIG. 4.

FIG. 7 is a view like FIG. 4 of another modified form of stem or nose.

FIG. 8 is an enlarged view in section taken along the line 8—8 in FIG. 7.

Figure 1:
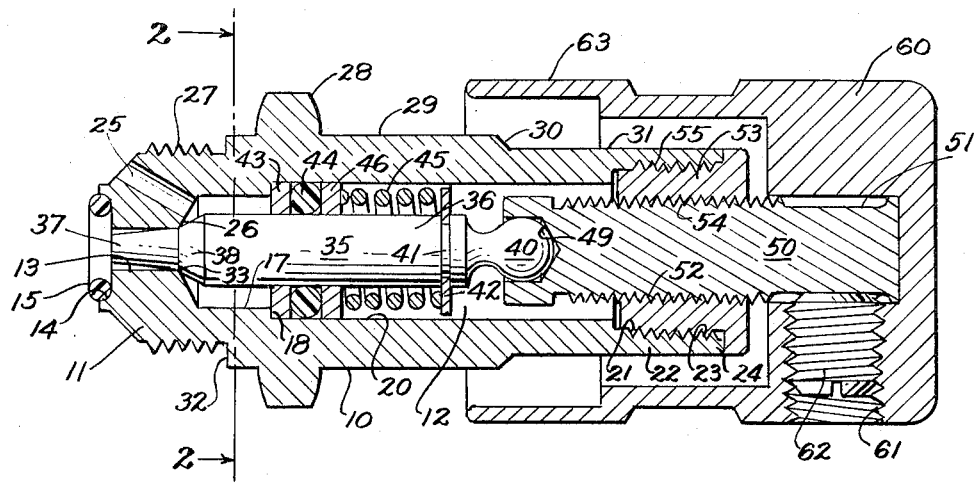
FIG. 1 is a view in elevation and in section of a valve embodying the principles of the invention, with the valve shown in its closed position.
Figure 2:
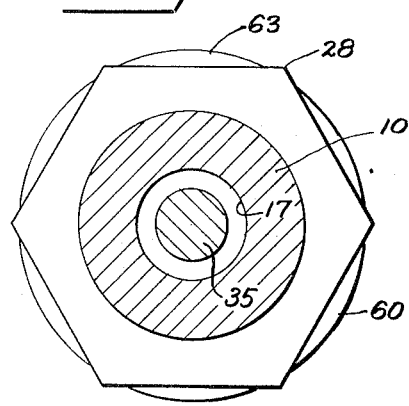
FIG. 2 is a view in section taken along the line 2—2 in FIG. 1.

The valve of this invention includes a housing or body 10 with a nose 11 at one end and an axial central passage 12 to which a central axial inlet passage 13 leads. The inlet passage 13 leads in from an annular recess 14 where a sealing O-ring 15 of suitable material, preferably polytetrafluoroethylene for most uses though synthetic elastomers like neoprene are suitable for some cases, may be provided when connecting the valve to a conduit or other gas container. The inlet passage 13 is of smaller diameter than either the recess 14 or the central passage 12, is cylindrical and leads into a frustoconical seat 16, which is also the forward end of the axial passage 12.

The axial passage 12 has a cylindrical bore portion 17 leading from the seat 16 to a step 18 whence a wider cylindrical bore portion 20 leads to a step 21 near the distal end of the passage 12. Beyond the step 21 is a third cylindrical portion 22, the outer portion being provided with interior threads 23. The housing 10 terminates in an annular end 24. At the forward end of the passage 12, an outlet passage 25 extends out angularly through the nose 11 from a radially outer portion of the seat 16. A seat portion 26 spaces apart the inlet 13 from the outlet 25. (It makes no difference in operation of this valve if the "outlet" 25 be used as the inlet and the "inlet" 13 be used as the outlet.) As for the exterior of the housing 10, the tapered nose 11 is succeeded by an exteriorly threaded portion 27 that lies rearwardly of the outlet 25 and which may be used to attach the valve to the gas container or conduit. Rearwardly of the threaded portion is, preferably, a hexagonal head 28 which may be used to tighten the housing 10 in place, and beyond that, a cylindrical wall portion 29 leads by a step 30 to a smaller-diameter portion 31. A shoulder 32 between the threads 27 and the head 28 is brought into sealing relation to another housing where the valve body 10 is installed. The shoulder 32 may be welded hermetically to the other housing, or gasketing may be employed. The juncture 33 of the inlet passage 13 and the seat 26 is the stationary flow control member.

The valve assembly is also provided with a closure and adjustment member 35 inside the housing 10. A main stem 36 of the member 35 is larger in diameter than the inlet 13 and much smaller in diameter than the cylindrical passages 17 and 20. At its nose end, the member 35 has a smaller, gently tapered forward stem 37, the rear end of which is almost the size of the inlet passage 13, and the forward stem 37 is joined to the main stem 36 by a frustoconical portion 38, the forward portion of which can close against the valve seat 16 around the inlet 13 to completely close the inlet 13. When the valve is opened (compare FIG. 3), the rearward position of the tapered stem portion 37 determines the width of the opening: the further it is to the rear, the wider is the opening, since the forward end of the stem portion or nose 37 is the smallest. The clearance between the nose 37 and the juncture 33 determines the flow.

The rear or distal end of the closure member 35 is provided with a ball 40. Just forward of the ball 40 at the distal end of the stem 36 is a groove 41 that holds a lock washer 42. Another washer 43 fits snugly inside the passage 20 against the step 18, and an O-ring gasket 44, preferably of polytetrafluoroethylene, is held against the washer 43 by a spring 45 which is seated against the washer 42 and presses against the gasket 44 through a third washer 46. The spring 45 does three things: (1) it holds the gasket 44 in sealing engagement and prevents leakage between the gasket 44 and the passages 20, (2) it also urges the valve member 35 to its open position, by its pressure against the washer 42, and (3) it assures repeatability (i.e., that the same valve handle position gives identically the same position of the nose 37) by (a) eliminating backlash of the threads 54 in the threads 23, since in all positions the stem 30 is urged rearwardly away from the inlet opening 13 and (b) by uniformly pressing on the gasket 44 so that no memory factor due to alternate tension and relaxation need be considered for the gasket 44 is always under compression in all valve positions.

The ball 40 of the valve stem is encircled by and engaged by a socket 49 of a valve actuating member 50. The member 50 is exteriorly threaded and preferably has an hexagonal rear end 51. The threads 52 of the member 50 tightly engage a nut 53, which not only has interior threads 54 to receive the threads 52 but also has exterior threads 55 that engage the threads 23 of the housing 10. The nut 53 is, of course, held stationary in the housing 10, and the member 50 moves back and forth in it when the member 50 is rotated.

Rotation may be provided by a handle 60 having a threaded opening 61 through which a set screw 62 is inserted and tightened against the hexagonal portion 51 of the member 50, so that the handle 60 and member 50 move together. The handle 60 may also have a skirt 63 which extends down over most of the valve body.

In operation, when the handle 60 is turned, the member 50 is rotated and consequently moves axially of the body 10. As it moves axially and rotationally, it engages the ball 40; it rotates relative to the ball 40, but it moves the ball 40 axially. On motion rearwardly away from the inlet opening 13, the spring 45 keeps the ball 40 tightly against the socket 49. This means that the size of the valve opening is determined by the position of the handle 60.

Since the stem 35 itself does not rotate but moves only axially toward and away from the valve seat 16, there is no rubbing action between the portions 16 and 38. Since there is no rubbing, there is no heating and no tendency for undesirable metal flow from the stem to the housing or vice versa.

When the portion 38 is moved away from the seat 16, gas can enter the inlet 13 into the space within the passage 17 and can then pass out through the outlet 25. The amount of gas that flows depends on the clearance between the stem nose 37 and the juncture 33 and this clearance is determined by the fore-and-aft position of the closure device 35; hence the valve can be used as a very fine metering or micrometering valve, and, when full closure is desired, that is also obtained.

A modified form of valve assembly is shown in FIG. 3. Instead of relying on the non-metallic O-ring 44 for sealing between the housing 10 and the stem 35, positive hermetic sealing is obtained by welding one end of a metallic bellows 70 to the stem 35 and welding the other end to the step 21 of the housing or body 10. In place of the O-ring 44 and washers 43 and 46, a stem-guide 71 is employed to align the stem 35 accurately in the body 10, a function done by the substituted members in the valve assembly of FIG. 1. In installation, the gasket 14 is usually omitted in this FIG. 3 device and the shoulder 32 is welded in place to give a hermetic seal there.

While the tapered stem nose 37 is quite suitable for many uses, it does not give a linear relationship between the gas flow and the actual displacement of the stem 35. A more nearly linear relationship may be obtained by the structure shown in FIGS. 4–6, where a cylindrical stem 75 is provided with a sloping face 76, confining the taper to this sloping flat 76.

Still more accurate and, in fact, substantially linear control can be obtained by the stem structures of FIGS. 7 and 8, where a cylindrical stem 80 is provided with a helical groove 81 whose depth is constantly varied from zeor near the meeting with the seating portion 38 and a maximum at the outer end 82. Preferably the groove 81 has a triangular shape, as shown, and preferably the triangle is substantially equilateral, so that the groove 81 makes an angle of approximately 60°. Since gas flow is proportional to the area available for flow, this helical groove 81 gives accurate control of the flow that changes approximately in direct linear proportion to the stem movement. Being helical, more variation is obtained, and is obtained more accurately, along a short stem nose length.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A fine-metering fluid valve including in combination:
   a hollow housing having a central axial passage with a reduced-size axial inlet at one end connected to the central passage by an annular valve seat ledge, said housing having a threaded distal end portion, said housing also having an outlet passage meeting said central passage and spaced away at all points from said inlet passage,
   a non-rotating valve closure member, comprising a stem extending along the axis in said central passage and having a ball at its distal end and having a closure nose with a forward portion movable in said inlet passage and a rear portion adapted to engage said valve seat and close off the inlet passage,
   means sealing between the stem of said valve closure member and said housing,
   a valve moving member having a socket at one end engaging said ball and a threaded stem movably threaded into the distal end of said housing, and
   spring means normally urging said valve closure member rearwardly and tending to open said valve means,
   said means sealing between the stem and housing comprising an O-ring positioned between a pair of annular members against one of which said spring means bears,
   said valve moving member being movable in said housing to determine the amount of the opening and to hold said valve nose at any desired opening or in a closed position without rotation of said valve closure member.

2. The valve of claim 1 wherein said inlet is generally cylindrical and wherein said nose forward portion is gently tapered, from a narrowest diameter at its free end.

3. A fine-metering gas valve including in combination:
   a generally tubular housing having a central axial passage with a nose at one end and a reduced-size axial inlet passage through the nose and connected to the central passage by a frustoconical seat, said passage having a step spaced away from said seat, and a threaded end portion beyond said step, said housing also having an outlet passage meeting said central passage at said seat and spaced away at all points from said inlet passage,
   a non-rotating valve closure member, comprising a stem extending along the axis in said central passage and having a ball at its distal end, a nose portion movable in said inlet passage, and a frustoconical portion joining said nose portion to the wider stem and adapted to seat in and close off the inlet passage, said nose portion providing means for increasing the clearance between itself and said seat as said valve closure member is opened,
   a nut stationarily threaded into the threaded end portion of said housing and having an interiorly threaded passage,
   a valve moving member having a socket at one end engaging said ball and a threaded stem movably threaded into said nut's interior threads,
   spring means normally urging said valve closure member rearwardly to cause opening of said valve, said valve moving member limiting the opening action of said valve and holding it at any desired opening and movable to a closed position, all without rotation of said valve closure member.

4. The valve of claim 3 having means sealing between said valve closure member and said housing at said step.

5. A fine-metering fluid valve including in combination:
- a hollow housing having a central axial passage with a reduced-size axial inlet at one end connected to the central passage by an annular valve seat ledge, said housing having a threaded distal end portion, said housing also having an outlet passage meeting said central passage and spaced away at all points from said inlet passage,
- a non-rotating valve closure member, comprising a stem extending along the axis in said central passage and having a ball at its distal end and having a closure nose with a forward portion movable in said inlet passage and a rear portion adapted to engage said valve seat and close off the inlet passage,
- said inlet passage being generally cylindrical and said nose forward portion being generally cylindrical and of smaller diameter than said inlet passage and provided with a helical groove whose area increases constantly from the end nearer said rear portion to the free end,
- means sealing between the stem of said valve closure member and said housing,
- a valve moving member having a socket at one end engaging said ball and a threaded stem movably threaded into the distal end of said housing, and
- spring means normally urging said valve closure member rearwardly and tending to open said valve means,
- said valve moving member being movable in said housing to determine the amount of the opening and to hold said valve nose at any desired opening or in a closed position without rotation of said valve closure member.

6. The valve of claim 5 wherein said groove is substantially triangular with its vertex angles approximately 60°.

7. A fine-metering fluid valve including in combination:
- a hollow housing having a central axial passage with a reduced-size axial inlet at one end connected to the central passage by an annular valve seat ledge, said housing having a threaded distal end portion, said housing also having an outlet passage meeting said central passage and spaced away at all points from said inlet passage,
- a non-rotating valve closure member, compriisng a stem extending along the axis in said central passage and having a ball at its distal end and having a closure nose with a forward portion movable in said inlet passage and a rear portion adapted to engage said valve seat and close off the inlet passage,
- means sealing between the stem of said valve closure member and said housing, said means sealing between the stem and housing comprising a metal bellows welded at one end to said stem and at the other end to said housing,
- a valve moving member having a socket at one end engaging said ball and a threaded stem movably threaded into the distal end of said housing, and
- spring means normally urging said valve closure member rearwardly and tending to open said valve means,
- said valve moving member being movable in said housing to determine the amount of the opening and to hold said valve nose at any desired opening or in a closed position without rotation of said valve closure member.

References Cited by the Examiner

UNITED STATES PATENTS

| | | | |
|---|---|---|---|
| 213,575 | 3/1879 | Johnston | 251—86 |
| 1,041,123 | 10/1912 | Lord | 251—220 |
| 2,188,850 | 1/1940 | Zinkil et al. | 251—276 X |
| 2,644,662 | 7/1953 | Powers | 251—122 |
| 3,050,044 | 8/1962 | Anderson | 251—126 X |
| 3,139,262 | 6/1964 | Morris et al. | 251—205 |
| 3,240,230 | 3/1966 | Callahan et al. | 251—205 X |

M. CARY NELSON, *Primary Examiner.*

R. C. MILLER, *Assistant Examiner.*